No. 727,140. PATENTED MAY 5, 1903.
N. P. HILL & J. R. CHAMBERLIN.
MINE MODEL OR EXHIBIT.
APPLICATION FILED OCT. 4, 1902.
NO MODEL. 2 SHEETS—SHEET 1.
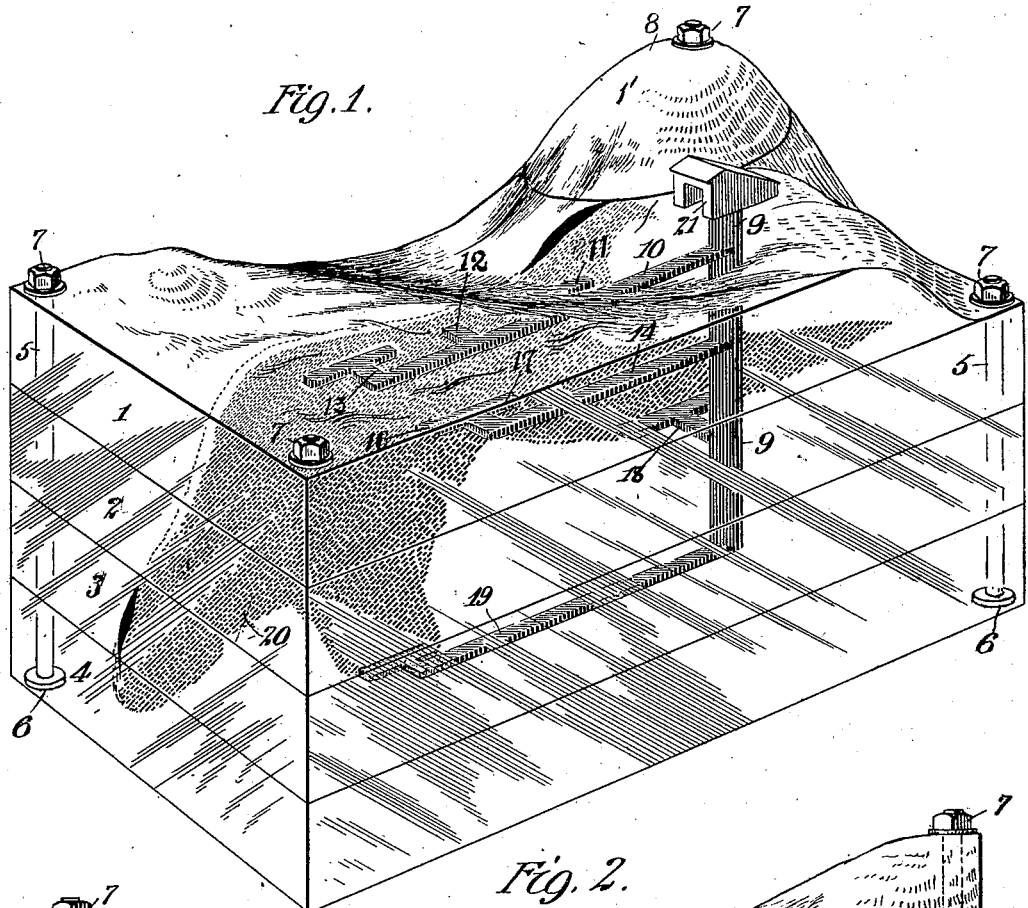
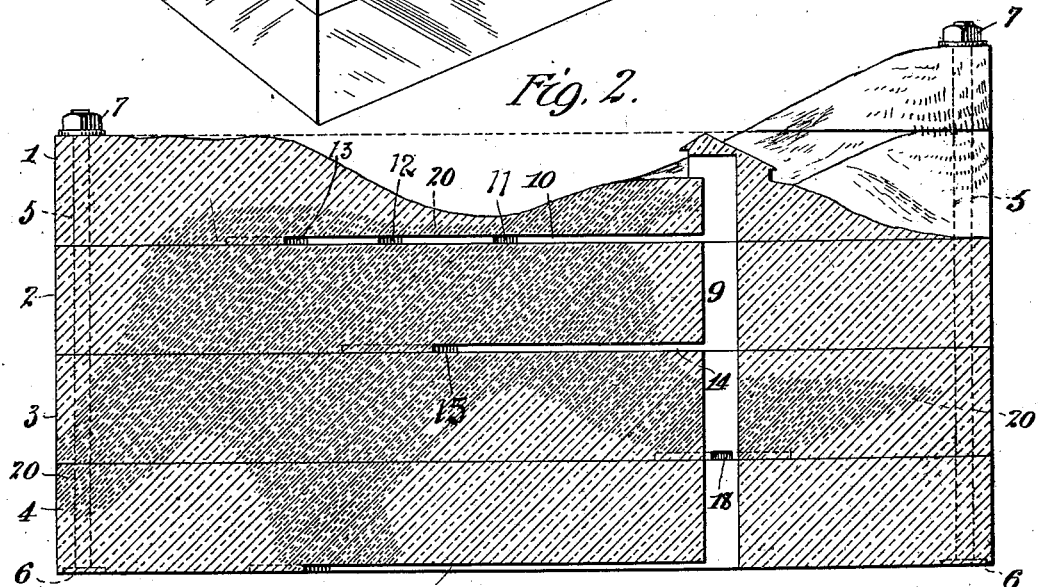

No. 727,140. PATENTED MAY 5, 1903.
N. P. HILL & J. R. CHAMBERLIN.
MINE MODEL OR EXHIBIT.
APPLICATION FILED OCT. 4, 1902.
NO MODEL. 2 SHEETS—SHEET 2.
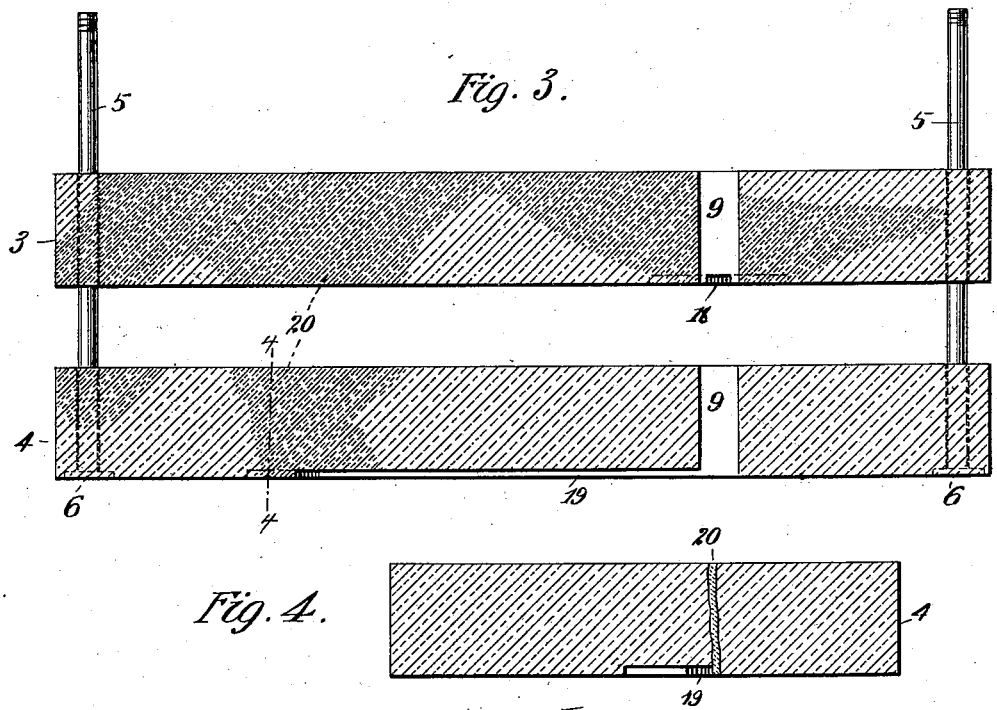
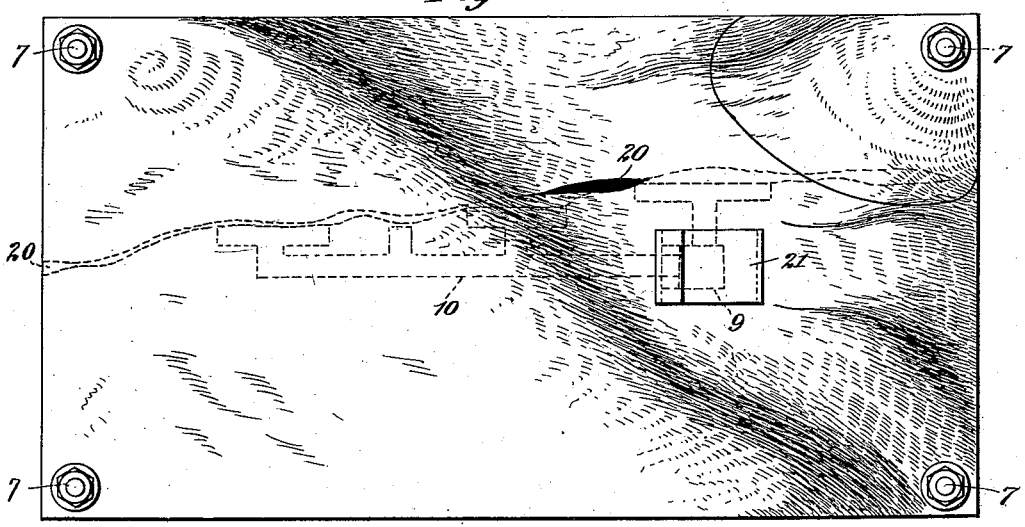

No. 727,140. Patented May 5, 1903.

UNITED STATES PATENT OFFICE.

NATHANIEL P. HILL, OF COLORADO SPRINGS, COLORADO, AND JOHN R. CHAMBERLIN, OF NEW YORK, N. Y., ASSIGNORS TO HILL-CHAMBERLIN MANUFACTURING COMPANY, A CORPORATION OF NEW YORK.

MINE MODEL OR EXHIBIT.

SPECIFICATION forming part of Letters Patent No. 727,140, dated May 5, 1903.

Application filed October 4, 1902. Serial No. 125,884. (No model.)

*To all whom it may concern:*

Be it known that we, NATHANIEL P. HILL, a resident of Colorado Springs, El Paso county, Colorado, and JOHN R. CHAMBERLIN, a resident of the city, county, and State of New York, citizens of the United States, have invented certain new and useful Improvements in Mine Models or Exhibits, of which the following is a specification.

The object of our invention is to provide a model or exhibit clearly illustrating the condition of a mine or other cutting in the earth, the medium or material forming the body of the model or exhibit being transparent, so that all side cuttings, drifts, tunnels, stopes, winzes, shafts, inclines, and other underground workings, all veins, dikes, fissures, contacts, and other geological features can be clearly seen, and also to show the surface conditions of the ground above the mine. We are aware that attempts have been made to produce models or exhibits for this purpose; but we are not aware that any one has hitherto produced a model or exhibit in transparent material enabling the observer to see at a glance the width, height, and dip of the vein, the stopes or other workings lying between the various levels, the location and dimensions of the shaft, and the character and extent of the drifts or tunnels extending from the shaft directly or from the drifts or tunnels extending from the shaft at an angle thereto. We understand that the art of cutting and perforating plates of transparent material such as glass, has hitherto been impracticable for this purpose, and as a corollary to the present invention we provide mechanism or apparatus for thus cutting or perforating glass, and we are filing an application for this mechanism or apparatus on the same day herewith. The present invention, however, is confined to the model or exhibit itself irrespective of the mechanism or apparatus by means of which it is produced.

Broadly, the exhibit apparatus which is herein described consists of plates of glass or other transparent material, which plates may be of varying thickness, provided with vertical or inclined openings, which when they register with each other represent the shaft of a mine, and also provided with horizontal cuttings (which may be at varying distances apart) representing main drifts and side drifts or tunnels, and also provided with cuttings representing the vein of mineral to be worked or being worked, and also showing along the top plate or plates the surface outline of the hill or mountain in which the mine is located.

Our invention will be understood by reference to the accompanying drawings, in which—

Figure 1 is a perspective of one of our mine models or exhibits. Fig. 2 is a vertical longitudinal section through the same. Fig. 3 is a similar section showing the two bottom plates of the model or exhibit, the lowermost plate being in position and the other plate being in process of being slipped into place. Fig. 4 is a transverse section along the line 4 4 in Fig. 3, and Fig. 5 is a plan of the model or exhibit.

Referring to the drawings, 1 2 3 4 are plates of glass or other transparent material, which are first treated separately and afterward clamped together by means of bolts 5 5, carrying countersunk washers 6 6 at their lower ends and being provided with nuts 7 7 at their upper ends for completing the clamping process. Any other suitable means for clamping the plates together may be used.

The top plate 1 in the present instance is ground by means of any suitable tool, so as to represent the surface outline of a hill or mountain in which the mine is located. As a matter of fact the summit 8 of the hill is here represented as forming part of a fifth plate 1', the most of which is ground away, as shown.

The shaft is shown at 9, the same being of square or rectangular shape, while at the bottom of the plate 1 is shown the uppermost drift or tunnel 10, together with a number of side tunnels 11, 12, and 13. At the bottom of plate 2 is shown another drift or main tunnel 14, together with side tunnels 15, 16, and 17, while at the bottom of plate 3 is shown another set of drifts or tunnels 18, and at the bottom of plate 4 is shown another set of drifts or tunnels 19.

The vein is shown at 20, and we generally represent this vein by means of longitudinal cuttings through the several plates, the walls of the cuttings being colored, so as to distinguish the vein from the other cuttings in the plates.

Upon the upper plates, ground and polished to accurately represent the surface above the mine, we show all buildings, roads, dumps, and other improvements by pieces of glass cut or ground to the required shape and size. In the drawings the shaft-house appears at 21.

It is not thought necessary in this specification to describe the means by which the various cuttings herein mentioned are made; but such description will be given and is given in a companion application executed on the same day herewith. We may say, however, that we usually employ plates of glass and clamp them together in the manner described or in some other suitable manner, and we usually select the scale of one hundred feet to one inch as suitable for representing ordinary mines. The plates shown in the drawings may be assumed to be one inch in thickness, and the drifts or tunnels may be assumed to be about one hundred feet apart in a vertical direction. It will be understood that should it become necessary to represent drifts fifty feet apart plates one-half inch in thickness will be selected, and so on for varying intervals between the levels. In other words, by a proper selection of thicknesses of glass plates to correspond with the vertical intervals between levels all features of the workings and the geological conditions of any given mine may be accurately represented to scale, and all irregularities in width or height of workings, thickness and extent of ore-bodies, veins, or dikes can be properly represented by the use of suitable excavating or grinding tools.

As to the inclination or dip of the vein of mineral, the thickness of the plates may be varied to enable this vein to be properly represented—that is to say, a new plate may be used wherever the natural dip of the vein takes a decided slant in some other direction between levels, it being possible by means of the apparatus we have designed to cut the plate either on a vertical or a slanting line, as the case may be.

From the foregoing it will be apparent that the completed model or exhibit will show the essential features of any given mine when the work of making the model or exhibit is properly done.

We claim as our invention—

1. A transparent mine model or exhibit consisting of separate plates of glass or other transparent material laid together, each plate representing a separate level.

2. A transparent mine model or exhibit consisting of two or more plates of glass or transparent material suitably clamped together, the upper plate or plates being ground or shaped to show the superficial outline of the land below which the mine is located, the said plates being perforated vertically or at angles to represent the mine shaft or incline, and the veins and dikes which traverse the mine, and being provided with horizontal cuttings to illustrate the drifts or tunnels at various levels below the surface.

3. A mine model or exhibit composed of two or more parts or pieces of transparent material laid together, the several parts or pieces being provided with cuts or perforations which, when the parts or pieces are placed together, show workings of a given mine.

4. A transparent mine model or exhibit showing the shaft, the vein, the drifts or tunnels, and the shaft-house, the latter being suitably supported above the mouth of the shaft and the model or exhibit being made up of parts or pieces placed together.

5. A transparent mine model or exhibit, showing the shaft, the vein, and the drifts or tunnels at various levels, such model or exhibit being made up of separate transparent parts, each of which has been separately worked or prepared to show a mine-working or a portion thereof.

6. A transparent mine model or exhibit, showing the shaft, the vein, the various levels, and the stopes or workings between levels, the model or exhibit being made up of separate transparent parts, placed together, each of which parts has been previously worked or prepared to show a mine-working or a portion thereof.

7. As an element of a mine model or exhibit, a plate or polyhedron of transparent material, such as glass, said plate being cut or perforated so as to show all or a portion of a mine-working.

8. A mine model or exhibit composed of separate transparent parts or pieces, the geological features, underground workings, and surface conditions being cut or carved from the several units composing the structure, so that when the parts are suitably fastened together, the whole will accurately represent a given mine.

Signed at Colorado Springs, in the county of El Paso and State of Colorado, this 29th day of September, A. D. 1902.

NATHANIEL P. HILL.

Witnesses:
  O. I. HOPKINS,
  H. C. ALLWARD.

Signed at New York, in the county and State of New York, this 3d day of October, A. D. 1902.

JOHN R. CHAMBERLIN.

Witnesses:
  WM. H. CAPEL,
  GEORGE H. STOCKBRIDGE.